April 7, 1964

J. R. ROSSI 3,127,829

PIPE BUNDLING APPARATUS

Filed July 12, 1960

INVENTOR.
JOSEPH R. ROSSI

BY Bosworth, Sessions
Herrstrom & Knowles
ATTORNEYS

April 7, 1964

J. R. ROSSI 3,127,829

PIPE BUNDLING APPARATUS

Filed July 12, 1960

INVENTOR.
JOSEPH R. ROSSI

BY Bosworth, Sessions
Herrstrom & Knowles
ATTORNEYS

Fig. 4

April 7, 1964 J. R. ROSSI 3,127,829
PIPE BUNDLING APPARATUS
Filed July 12, 1960 9 Sheets-Sheet 9

INVENTOR.
JOSEPH R. ROSSI
BY Bosworth, Sessions
Herrstrom & Knowles
ATTORNEYS

United States Patent Office 3,127,829
Patented Apr. 7, 1964

3,127,829
PIPE BUNDLING APPARATUS
Joseph R. Rossi, Cortland, Ohio, assignor to Blaw-Knox Company, Pittsburgh, Pa., a corporation of Delaware
Filed July 12, 1960, Ser. No. 42,274
19 Claims. (Cl. 100—4)

This invention relates to apparatus for forming bundles of pipes, tubes, rods and the like, and more particularly to high speed apparatus for sequentially arranging a predetermined number of transversely aligned lengths of pipe, tube, rod or other elongated material, in a predetermined cross sectional relationship to each other, securely wrapping them with strand material to form a bundle, and conveying the bundles away from the wrapping area, preferably to an unloading station where they are unloaded from the conveying means into loads containing predetermined numbers of bundles. The invention is described herein as applied to the bundling of butt welded pipe, but it is to be understood that the invention may be applied to other purposes and uses.

It is possible to produce butt welded pipe at high rates of speed, ranging up to 1000 or more feet per minute. The high rate of production makes the disposition of the pipe a matter of great importance, since if the pipe cannot be disposed of at a corresponding rate, the economic advantages of the high production rate are negated. In modern pipe mills it is the practice to saw or shear the pipe into commercial lengths of, for example, 20 to 40 feet as the pipe leaves the welding mill and without stopping the pipe, then to move the rapidly traveling lengths onto a cooling bed or other conveyor, and then to dispose of them, either directly or after they have been subjected to further processing such as a galvanizing operation.

By use of apparatus of the present invention, the pipe can be received from a cooling bed directly after welding or after a galvanizing or other operation, and be bundled, removed and, if desired, formed into loads consisting of a predetermined number of bundles, these operations being performed automatically and at a high speed corresponding to the speed of production of the pipe. While the apparatus of the invention provides exceptional advantages when used in conjunction with pipe manufacturing apparatus, it is obvious it may be employed separately.

A general object of the invention is to provide efficient and reliable apparatus adapted to operate continuously and rapidly to assemble a predetermined number of lengths of pipe, tube, rod or the like in a transversely aligned, predetermined cross sectional relationship to form a bundle (the term "bundle" being used herein to mean a single member or several members assembled together), securely wrap the bundle, when it consists of more than one member, and remove the bundles, preferably to a station where they are formed into loads of predetermined numbers of bundles which may be easily handled. Further objects and advantages of the invention will become apparent from the following description of a preferred form thereof as applied to the formation and handling of bundles of pipes, reference being made to the accompanying drawings in which:

*General arrangement.*—The illustrated apparatus as a whole, as shown in FIGURES 1, 2, 3 and 4, comprises a generally transversely extending table 1 supporting and feeding the pipes P which are to be bundled; a bundling section 2 adapted to form sequentially bundles B of pipes P, by arranging a predetermined number of pipes in a predetermined lateral relationship to each other to provide a bundle of compact cross section and wrapping such bundle with strand material; a longitudinally movable conveyor 3 adapted to receive, from bundling section 2, groups each consisting of a predetermined number of completed bundles of tubes, and to transport them away; and an unloading section 4 at which the groups of bundles are unloaded from the conveyor 3 and assembled into one or more loads consisting of a predetermined number of completed bundles. These sections are actuated to cooperate to perform the above operations by suitable control means, the control center of which is generally indicated at 5. The table 1, conveyor 3, and unloading section 4 are supported from the floor 6, while the devices of the bundling section are supported by the raised platform 7 which is supported from the floor.

Figure 1:
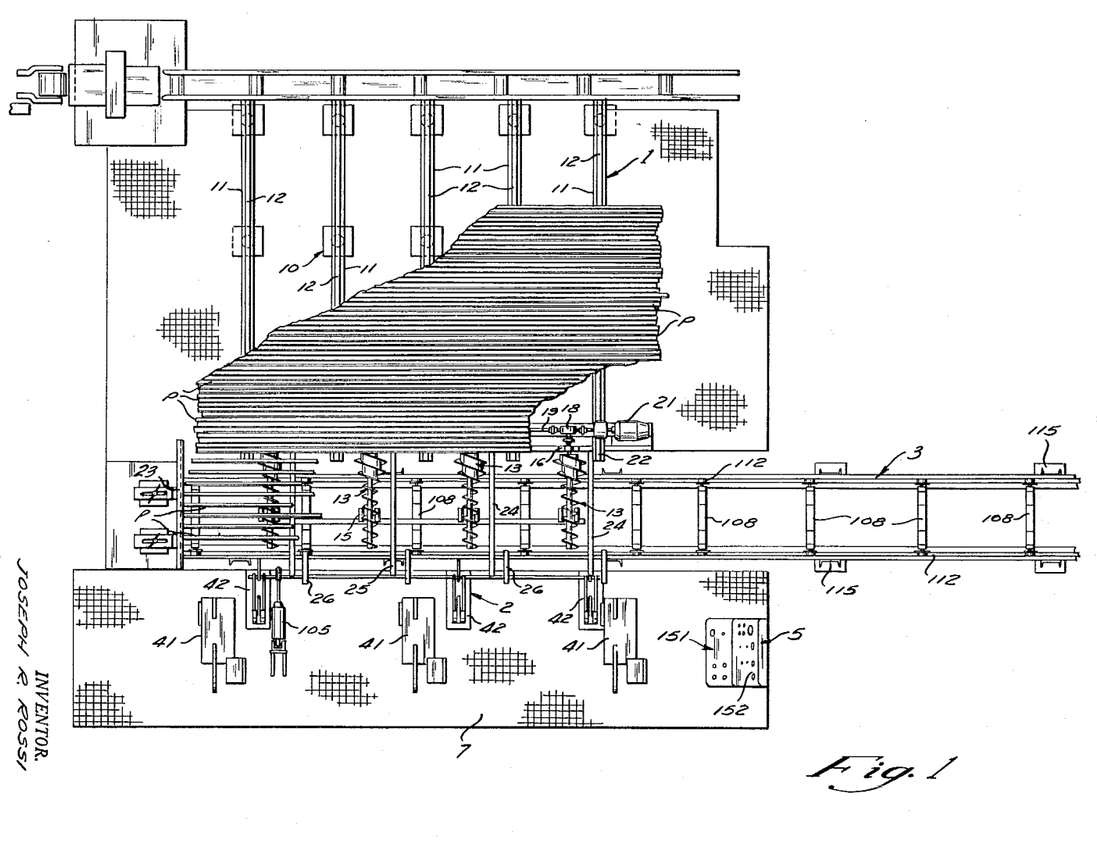
FIGURE 1 is a somewhat diagrammatic plan of a portion of such apparatus, showing the pipe storing and discharging table, bundling section, and a portion of a conveyor for transporting bundles away.

*Loading table.*—The loading table 1 is designed to receive at its rear portion pipes P from a suitable source such as a cooling bed associated with pipe manufacturing apparatus or galvanizing equipment, or a conveyor or crane, to support such pipes substantially horizontally and advance them transversely to the front end of the table, and at proper times to discharge individually a predetermined number of pipes from the front edge of the table into the bundling section 2 while the pipes are substantially horizontal and one end of each pipe is transversely aligned with the corresponding ends of other pipes forming a bundle.

The illustrated table 1 comprises a frame 10 made up of several pipe supporting members 11 extending transversely from the rear of the table to points near its front, this being the direction in which the pipes move across the table. It is desirable that each of these members 11 have a pipe supporting surface layer 12 formed of wear-resistant material. Preferably, the pipe supporting surfaces of all members 11 are horizontally aligned in the longitudinal direction of the table, and inclined transversely of the table so that the pipes P can roll by gravity down the members 11 from the elevated rear toward the front end of the table. The pipes P could, however, be moved across this section of the table by other means if desired.

At its front portion, the table 1 is provided with means to separate the pipes P from each other, positively to move them laterally toward the front edge of the table and to discharge to the handling section 2, one pipe at a time, the predetermined number of pipes to form each bundle. This means comprises several helical conveyor members 13, which are mounted and adapted to be rotated in unison about substantially horizontal axes located between members 11 and extending transversely of the table and in the direction of travel of the pipes P. Each member 13 has a helical thread or cam 14; the helical threads of all members 13 are identical and located in identical angular relations relatively to each other, so that when the several threads 14 engage a pipe P and rotate in unison the pipe is moved equally at all points while in a substantially horizontal position. Preferably each member 13 is shaped so that the outside edges of its thread 14 and its root portions from which the thread projects define surfaces of revolution which are substantially cylindrical throughout the major portion of the length of member 13 from the front end toward the rear. Near the rear, however, the threads are of larger diameter and the root portions are shaped to lift and then lower the pipes as described below. Each of members 13 is rotatably supported by at least two rollers 15 each of which is freely rotatably mounted on the frame 10 of the table 1 at one side of the member 13 and provides rolling support for the cylindrical portion of thread 14 near the front of helical member 13, and by bearing 16 which is fixed to frame 10 of the table and rotatably supports shaft 17 at the rear of member 13. All helical members 13 are rotated in unison at the proper times by gear units 18 driven by line shaft 19 rotated by motor 21.

Figure 3:
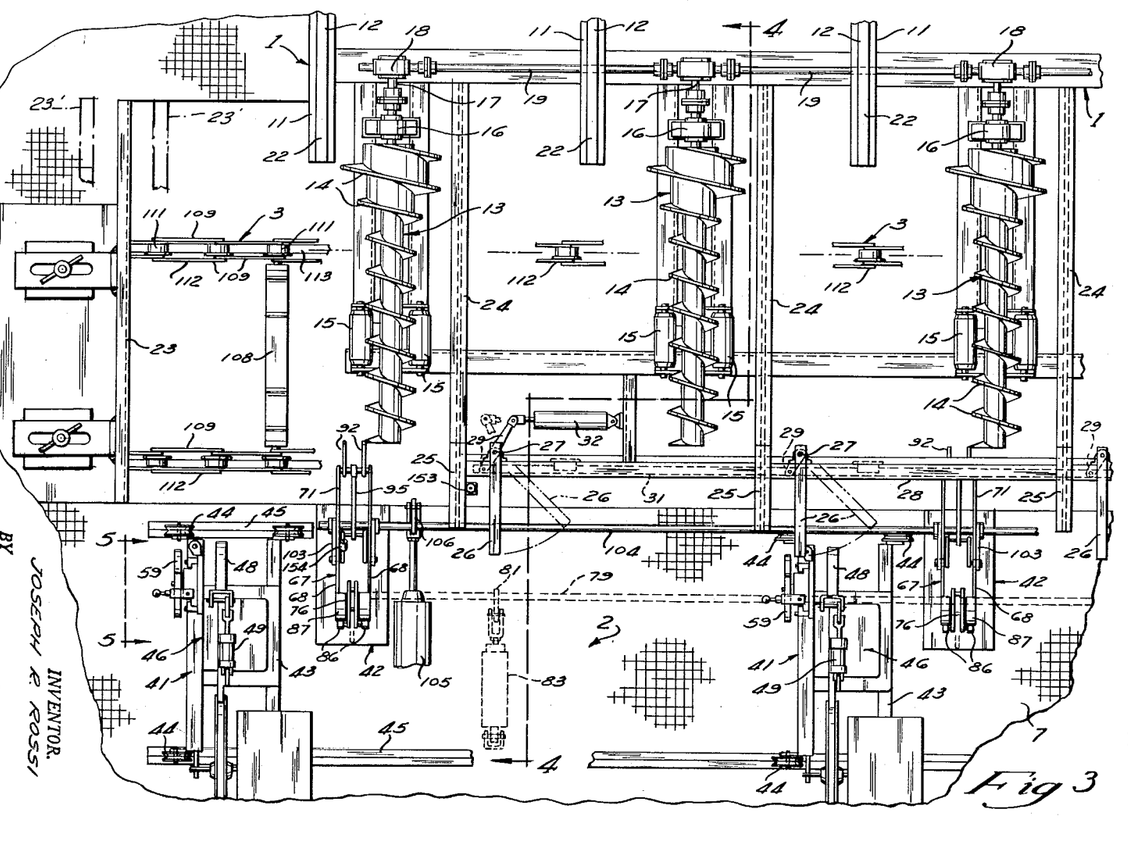
FIGURE 3 is a plan to an enlarged scale, of portions of the discharge end of the table and the bundling section of the apparatus of FIGURE 1.
Figure 4:
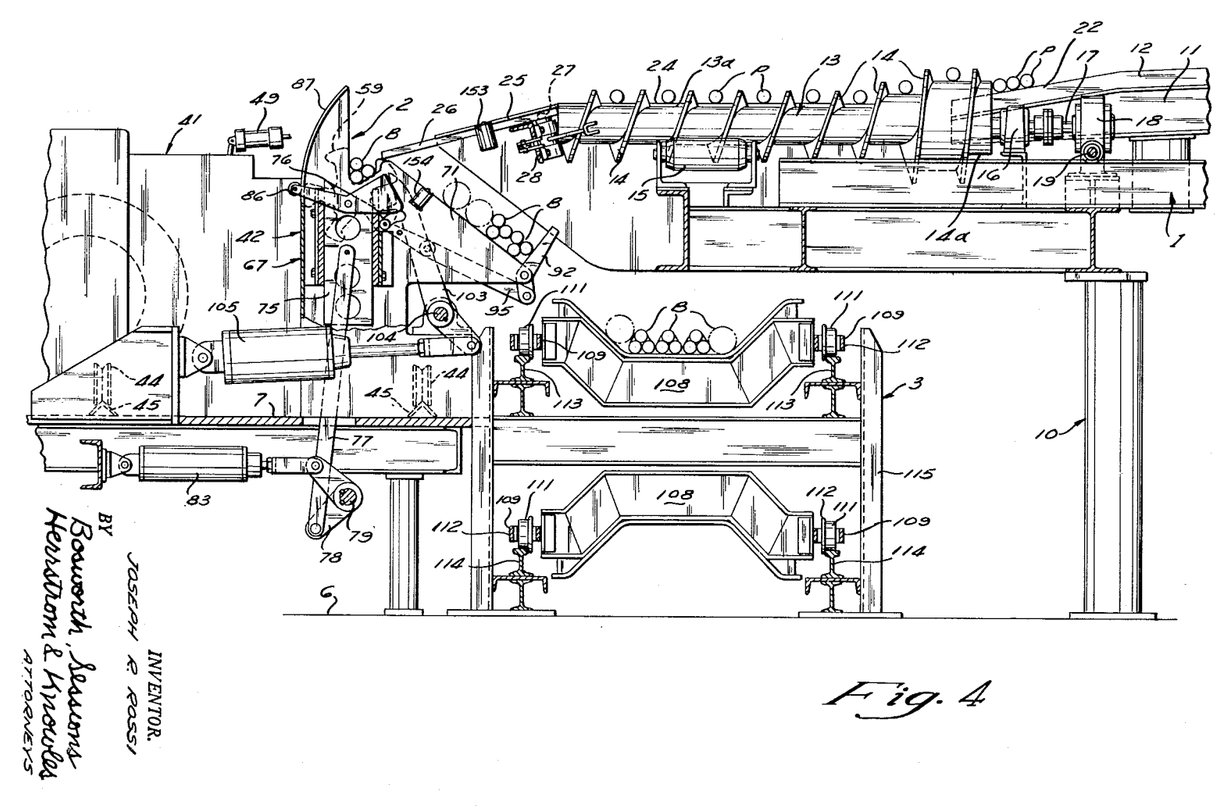
FIGURE 4 is a sectional elevation of the portion of the apparatus of FIGURE 3, to the same scale and along line 4—4 of FIGURE 3.

In order to support the pipes as they move into engagement with, and as they are moved by, the threads 14 of helical conveyor members 13 the forward end portions 22 of the pipe supporting members 11 extend slightly beyond the enlarged rear ends of helical members 13. The top surfaces of end portions 22 incline downwardly at a substantial angle from points above to points below the root portions of the enlarged rear ends of the helical members 13 when the members are in the position shown in FIGURE 4 so that the root portions in this position act as stops to hold back the pipes P as shown. The rear ends of the root portions, however, are eccentric, and when the members 13 are rotated 180° from the positions shown, the root portion indicated at 14a lies at a level below the level of the tops of end portions 22 so that a single pipe section can roll onto the root portions. With this arrangement, only one pipe P is disposed between adjacent threads 14, as shown. Rotation of the members 13 lifts the pipes above the level of the end portions and moves them to the left in FIGURE 1 in the direction of rotation of the members until the ends of the pipes abut the guide member 23, which is adjustable, as shown in FIGURES 1 and 3, thus aligning the ends of all of the pipes.

In order to prevent undue wear on the members 13, a pipe supporting bar 24 (see FIGURES 3 and 4) is rigidly carried by frame 10 adjacent each helical member 13. The top surface of the major portion of each bar 24 is generally horizontal and is located slightly above the surface of the root portion 13a of the associated helical member 13 to support the pipes P out of contact with the root portion. The bars extend throughout the length of the members 13. Each bar 24 also includes a front portion 25 having a downwardly inclined top surface projecting beyond the front end of such member 13.

In order to support and deliver the pipes from the member 13 to the bundling section 2, several feeder members 26 are pivotally mounted adjacent the supporting bars 24 at the front end of table 1. In extended or pipe discharge position, each feeder member 26 is located with its longitudinal axis lying in a plane substantially parallel to the axis of the adjacent helical member 13, with its top surface paralleling the top surface of the adjacent supporting bar 24, and with its forward end projecting beyond the forward end of such bar 24 sufficiently to closely approach the location at which the pipes are bundled in section 2. In retracted position, each feeder member 26 is pivoted about its rear end so that its forward end is inclined away from its associated bar 24 as shown in broken lines in FIGURE 3; this movement provides clearance for pipes or bundles being discharged from the bundling section. To permit such movement, the feeder members 26 are fixed at their rear ends to pins 27 pivotally mounted at a suitable angle in brackets 28 fixed to the frame 10 of the table, and are simultaneously moved between their extended and retracted positions by levers 29 fixed to the pins 27 and pivotally connected to an actuating bar 31 extending along the front edge of table 1; the actuating bar is moved longitudinally back and forth at the proper times by an air cylinder 32 controlled by suitable means to be later described.

During operation of table 1 thus described, the pipes P, which are supplied to the elevated rear end of the table by suitable means as indicated above, move transversely down the inclined pipe supporting members 11 and over their inclined end portions 25 until they reach the rear enlarged ends of the helical conveyor members 13. In this portion of the travel, the pipes roll by gravity across the table, with adjacent pipes in contact. Thereafter the pipes are positively advanced in spaced parallel relation across table 1 by the threads 14 of the rotating helical conveyor members 13. These helical members are periodically rotated in unison by motor 21 the number of turns required to discharge into the bundling section 2 a predetermined number of pipes to form a bundle B. As members 13 rotate, their threads 14 and their enlarged root portions at their rear ends simultaneously engage the nearest pipe, lift it, move it forward, and move it to the left toward the gage 23. The pipe is then lowered by the root portions of diminishing diameter until it reaches and is supported by the horizontal portions of supporting bars 24, where it is contacted by the threads 14 on the smaller diameter portions of members 13 and moved substantially horizontally and transversely of the table to the front end where the pipe is discharged. The threads 14 of the rotating members 13 also tend to move the pipes P longitudinally to the left so that one end of each is urged into contact with the guide plate or gage 23; thus the ends of the pipes carried by the members 13 are all transversely aligned to arrange the pipes longitudinally of each other in predetermined relationship.

After a pipe is discharged from the forward ends of members 13, the impetus of discharge and the effect of gravity cause it to roll over the inclined end portions 25 of supporting bars 24 to the ends of the inclined feeder members 26 which are in their extended positions, from which it drops into the bundling section 2. All pipes are thus passed one at a time into the bundling section 2 while they are substantially horizontal and while their ends are in contact with guide member 23, thus aiding in assembly of the pipes into a bundle in which the pipes are parallel and the pipe ends, at least at one end of the bundle, are aligned.

*Bundling section.*—The major elements of the bundling section 2 comprise a plurality of bundling devices 41, which operate in unison to form pipe bundles B, and a plurality of bundle discharge devices 42 which operate simultaneously to lift the completed bundles B from the devices 41, accumulate and temporarily store a group of a predetermined number of such bundles which, as noted above, may consist of one pipe or a plurality of pipes, and then discharge such group of bundles upon the longitudinal conveyor 3.

Figures 5, 6, 7:
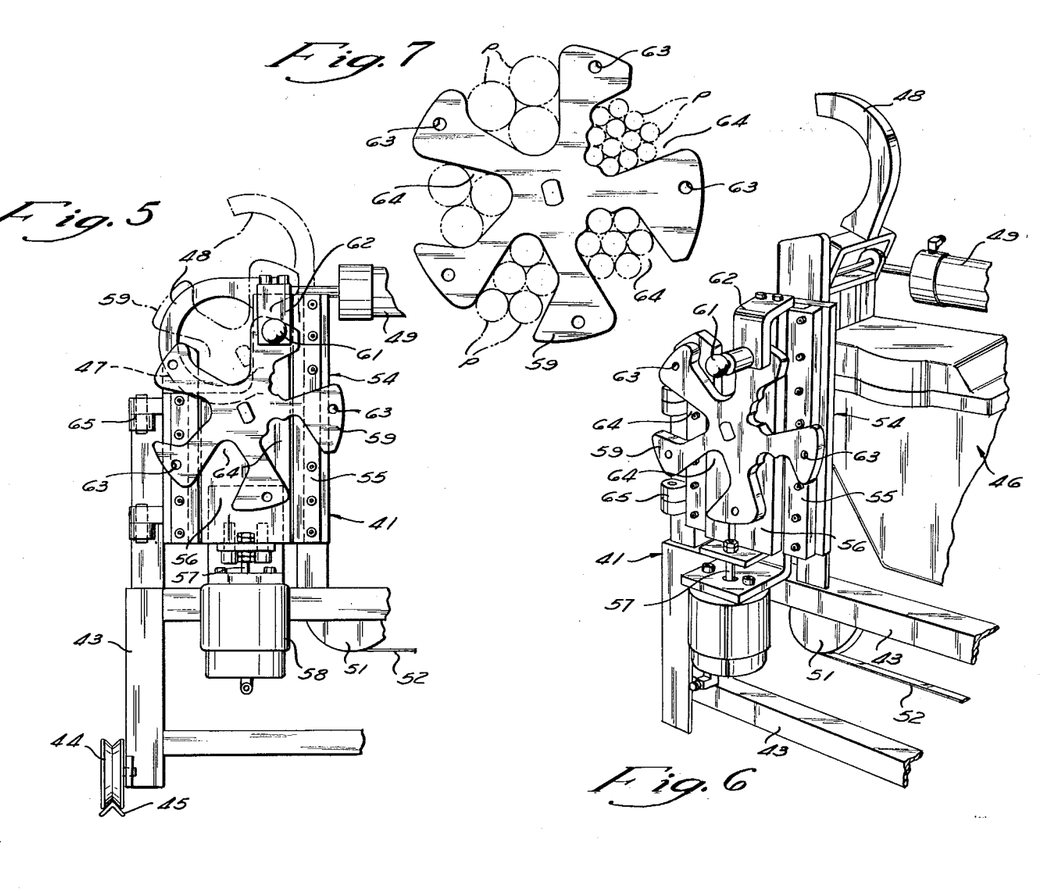
FIGURE 5 is a detail side elevation, along line 5—5 of FIGURE 3 but to an enlarged scale, showing one of the wrapping heads and an associated pipe supporting device.
FIGURE 6 is a perspective, showing the relationship of the parts of FIGURE 5.
FIGURE 7 is an elevation of one of the fixture wheels for supporting the pipes during the handling operation.

As shown in FIGURES 1, 5 and 6, each of the bundling devices 41 comprises a frame 43 mounted on rollers 44 carried by tracks 45 which are supported from the platform 7; the devices 41 thus can be moved to different positions lengthwise of table 1 to accommodate different lengths of pipe. Each frame 43 carries an automatic wrapping machine 46 which includes a wrapping head comprising a base portion 47 and a pivoted portion 48. The pivoted portion 48 of the wrapping head is adapted to be closed to surround the pipes P for the wrapping operation as shown in FIGURE 5, and to be swung back to an open position to receive the individual pipes P about to be bundled and to discharge the bundle of pipes after they have been bundled as shown in FIGURE 6; the pivoted portion 48 is actuated at the proper times by an air cylinder 49 controlled by suitable means to be later described. Each wrapping machine 46 shown, comprising the wrapping head including base portion 47 and pivoted portion 48 is a commercially available known type of machine for applying steel strapping material; machines manufactured by Signode Steel Strapping Company are suitable for the purpose. Included in each bundling device 41 is a spool 51 carrying the steel strapping material 52 which is wrapped around the pipe bundles by the wrapping machine 46.

Each bundling device 41 also includes pipe supporting means which, in unison with similar means on other bundling devices 41 along the table 1, is raised to receive from the table 1 the predetermined number of pipes for a bundle, to arrange these pipes in predetermined positions with respect to each other so that after wrapping the pipes cannot move relatively to each other in the bundle, to lower the pipes to wrapping position, and to support the pipes during the wrapping operation. Each pipe supporting means comprises a fixed base member 54 provided with guides 55 which support a slidable member 56 for vertical movement. This slidable member is connected at its lower end to the piston rod 57 of an air cylinder 58 which is adapted to raise and lower the slidable member 56 when controlled to do so and which is rigidly connected to base member 54. Although the base member 54 may be supported from the floor or platform, it is preferably supported from the frame 43 of the bundling device by means of a hinged connection 65 which permits the whole supporting means to be swung away from the side of machine 41 to allow access for threading of the strapping material, maintenance, or the like.

In order to insure that the pipes are properly arranged in the bundles, each slidable member 56 carries a supporting member 59 adjustable to accept any one of several different pipe bundles made up of different diameters and numbers of pipes. In the devices shown, the supporting member 59 takes the form of a generally star-shaped fixture wheel rotatably mounted on slidable member 56 and adapted to be manually adjusted and locked in any one of several angular positions relatively to member 56 to accept different bundles; the locking means is a spring-loaded pin 61 mounted in bracket 62 fixed to the top of member 56 and adapted to engage any one of several positioning holes 63 at the periphery of wheel 59. Fixture wheel 59 also comprises several recesses 64, each of which extends inwardly from the wheel periphery. Each recess is shaped differently from all other recesses 64 to receive a different number of pipes of a different size so that when the pipes drop into the corresponding recesses of the wheels of the several bundling devices, the recesses arrange the pipes in predetermined relationship transversely to each other, into a bundle of the most compact cross section for that number and size of pipes. The pipes cannot slip relatively to each other in the wrapped bundle to form a smaller cross section causing the pipes to loosen in the wrapping. FIGURE 7 illustrates a preferred form of fixture wheel, showing the position the pipes P take in each pocket, it being understood that only the uppermost pocket receives pipes at any one time. It will be evident that pockets of different configuration or size can be employed for different numbers or sizes of pipe per bundle. However, the bundles must be of the most compact configuration that is possible in order to prevent loosening or displacement of the pipes in the wrappings. The fixture wheels 59 on all machines 41 are manually set and locked so that identical recesses 64 corresponding to the particular size and number of pipes to be bundled are located in the upper bundle-receiving position.

Several bundle discharge devices 42 (see FIGURES 3, 4, 8 and 9) are included in the bundling section 2 to lift the bundles from the bundling devices 41, accumulate a predetermined number of bundles into a group, and discharge the group of bundles onto the conveyor 3; they are spaced along the edge of the table 1 and between the bundling devices 41 at positions suitable to support the pipe bundles properly during such operations. Each device comprises a rigid housing 67 supported from the platform 7 and including two spaced side wall members 68; each member 68 comprises an upwardly extending portion 69 and a laterally extending portion 71 defining between them a recess 72 through which the pipes P of a bundle extend during the bundling operation. These recesses do not contact the pipes, inasmuch as the pipes are supported in the recesses 64 or fixture wheels 59 associated with the bundling devices 41 during the bundling operation. Spaced vertical channel members 73 are rigidly connected between the inner surfaces of the side members 68 of the housing. Members 73 support centrally located vertical guides 74 which slidably carry a cross head 75. Upward movement of the cross head causes a pair of bundle-lifting or discharge members 76, which are pivotally carried by the cross head, to lift a bundle of pipes from the recess 72. Cross head 75 is moved vertically by a link 77 pivotally connected at its upper end to the cross head and at its lower end to an arm 78 rigidly fixed to a shaft 79. This shaft, which is rotatably mounted below platform 7 to extend along the bundling section 2, actuates the cross heads 75 of all bundle discharge devices 42. The shaft 79 is rotated the required amount in each direction by an arm 81 connected to the piston rod 82 of an air cylinder 83 which is controlled by suitable means later described.

In each discharge device, the two bundle lifting members 76 are pivotally mounted on opposite sides of the cross head 75 by a short shaft 84. Each bundle lifting member includes an arm portion 85 at the end of which is mounted a roller 86 adapted to roll along and be guided by a cam surface 87 on the adjacent side member 68 of the housing 67. Each member also includes a bundle lifting portion 88 which extends oppositely from arm portion 85 and is sufficiently large to support the bundle during the lifting operation and to outweigh considerably the arm portion 85 and roller 86 so that the roller will always follow the cam surface 87. The guide-supporting members 73 are recessed to clear the bundle lifting members 76 during their movement.

Figures 8, 9:
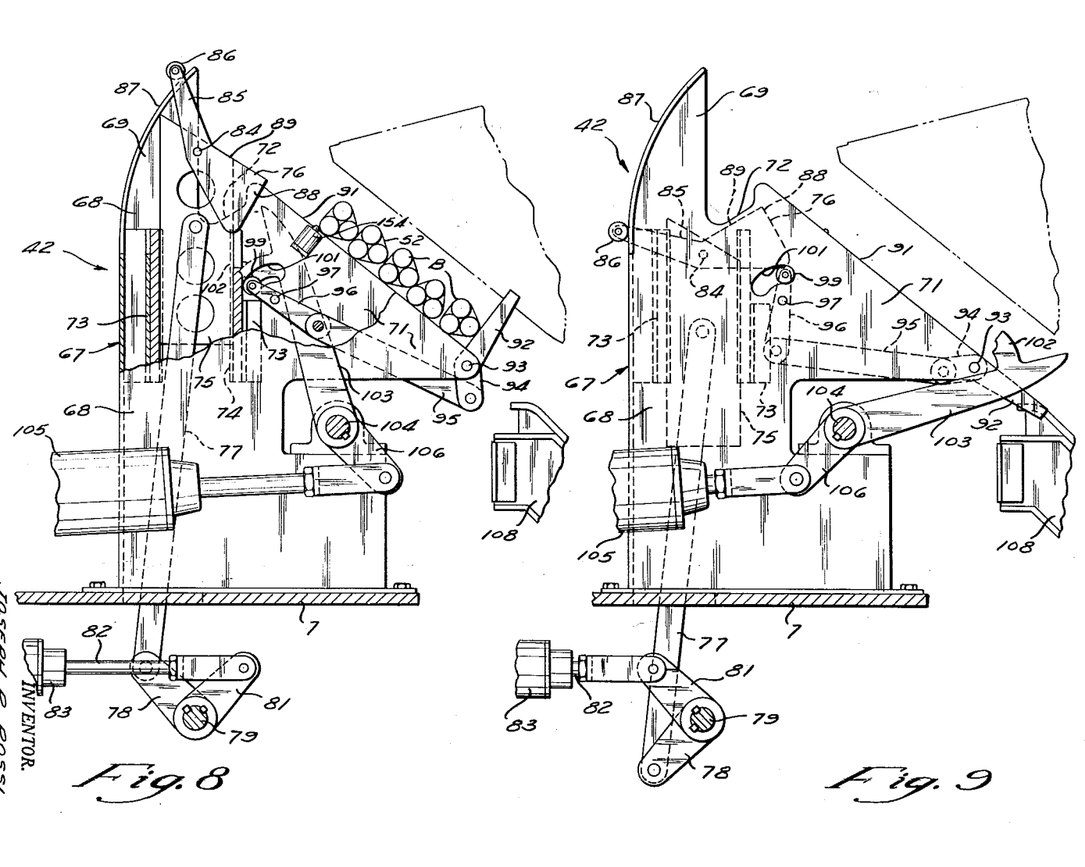
FIGURE 8 is a detail side elevation to the same enlarged scale as FIGURE 5, of one of the bundle discharge devices, with parts thereof in the position they occupy immediately after removal of a wrapped bundle from the wrapping position, other parts being broken away more clearly to show the mechanism.
FIGURE 9 is a side elevation of the same device to the same scale, with its parts in the position they occupy immediately after discharge of a group of bundles onto the conveyor.

As shown in FIGURES 8 and 9, the identical bundle lifting members 76, the identical cam surfaces 87 and the identical recesses 72 of housings 67 of all bundle discharge devices 42 are so shaped and related that when the cross heads 75 are at the bottom of their strokes the upper surfaces 89 of bundle lifting members 76 are no higher than the lower edges of the recesses 72 and hence do not contact the pipes. As the cross heads 75 move upwardly, their movement and the movement of the rollers 86 of the lifting members along the cam surfaces 87 cause the bundle lifting members 76 to pivot about their common axis so that their lifting surfaces 89 contact and lift the completed bundle B of pipes from its location in recesses 72. When the cross heads 75 are at the tops of their strokes the bundle lifting members 76 are tilted so their surfaces 89 are closely aligned with the downwardly inclined surfaces 91 of the lateral portions 71 of the housing side wall 68, thus permitting the pipe bundle B to slide off the surfaces 89 onto the inclined surfaces 91. These surfaces 91 are inclined at an angle sufficient to cause each pipe bundle B to slide down the surfaces by gravity until it is stopped by other pipe bundles or by the raised stop members 92 disposed near the lower ends of surfaces 91 on each bundle discharge device 42.

On each device 42, stop member 92 is raised to hold the bundles deposited on surfaces 91 of the housing 67 until a predetermined number of bundles has been accumulated, and then is lowered to permit the bundles to be discharged onto the conveyor 3. To this end, the stop member 92 is pivotally mounted by a shaft 93 carried by the outer ends of the lateral portions 71 of housing wall members 68. Stop member 92 rigidly carries a generally oppositely extending arm portion 94, pivotally connected to one end of a link member 95 the other end of which is similarly connected to an end of a lever member 96 rotatably mounted on a short shaft 97 rigidly fixed in the side members 68 of housing 67. The stop member 92, lever member 96, shaft 97, and the connecting linkage members are all located between the side members 68 of housing 67.

At its end remote from link member 95, lever member 96 rotatably carries a pair of outwardly extending rollers 99, each of which projects through a suitably shaped slot 101 in the adjacent housing side member 68. Each roller 99 is adapted to engage a laterally extending portion 102 of an actuating arm 103 located outside of its adjacent housing side member 68. The lower end of each arm 103 for each bundle discharge device 42 is rigidly mounted on an actuating shaft 104 that is common to all bundle discharge devices 42. Shaft 104 is mounted for rotary movement at the lower portion of each discharge device 42 and is actuated by an air cylinder 105 through a lever 106 fixed to the shaft. When controlled as later described, the air cylinder 105 partially rotates the shaft 104 in one direction so that the arms 103 of each bundle discharge device 42 move from the upright position shown in FIGURE 8 in which they press against the rollers 99 of levers 96 and through the described linkage cause stop members 92 to extend upwardly in bundle storing relationship, to the lateral position shown in FIGURE 9 in which the arms 103 have pushed any pipe bundles off the inclined surfaces 91 into conveyor 3 and the stop member 92 has retracted downwardly to a position where its top surface is in substantial alignment with the inclined surfaces 91 of housing 67 due to the action of gravity on member 92 and its linkage and the action of the pipe bundles pushed against it by arms 103. The cylinder 105 also partially rotates the shaft 104 in the opposite direction so as to move the actuating arms 103 from the lateral position of FIGURE 9 to the upright position of FIGURE 8 during which movement the projections 102 of arms 103 engage and press back the rollers 99 to reset the stop members 92 in upright bundle-storing position.

The air cylinder 105 is controlled by suitable means to be later described to so partially rotate the shaft 104 to move the arms 103 downwardly to discharge pipe bundles from inclined surfaces 91 to the conveyor 3 after a predetermined number of bundles have been accumulated and to move the arms 103 upwardly to reset the stop member 92 after such discharge.

*Conveyor.*—The conveyor 3, which is of the horizontally longitudinally traveling belt or chain type, is controlled to remain stationary while a group consisting of a predetermined number of bundles is being discharged on it by the bundle discharge devices 42 described above, and then to move the bundles to the loading section 4; the conveyor can be controlled to move the bundles the full distance to the unloading section, or only sufficiently to clear the bundling section 2.

Figure 10:
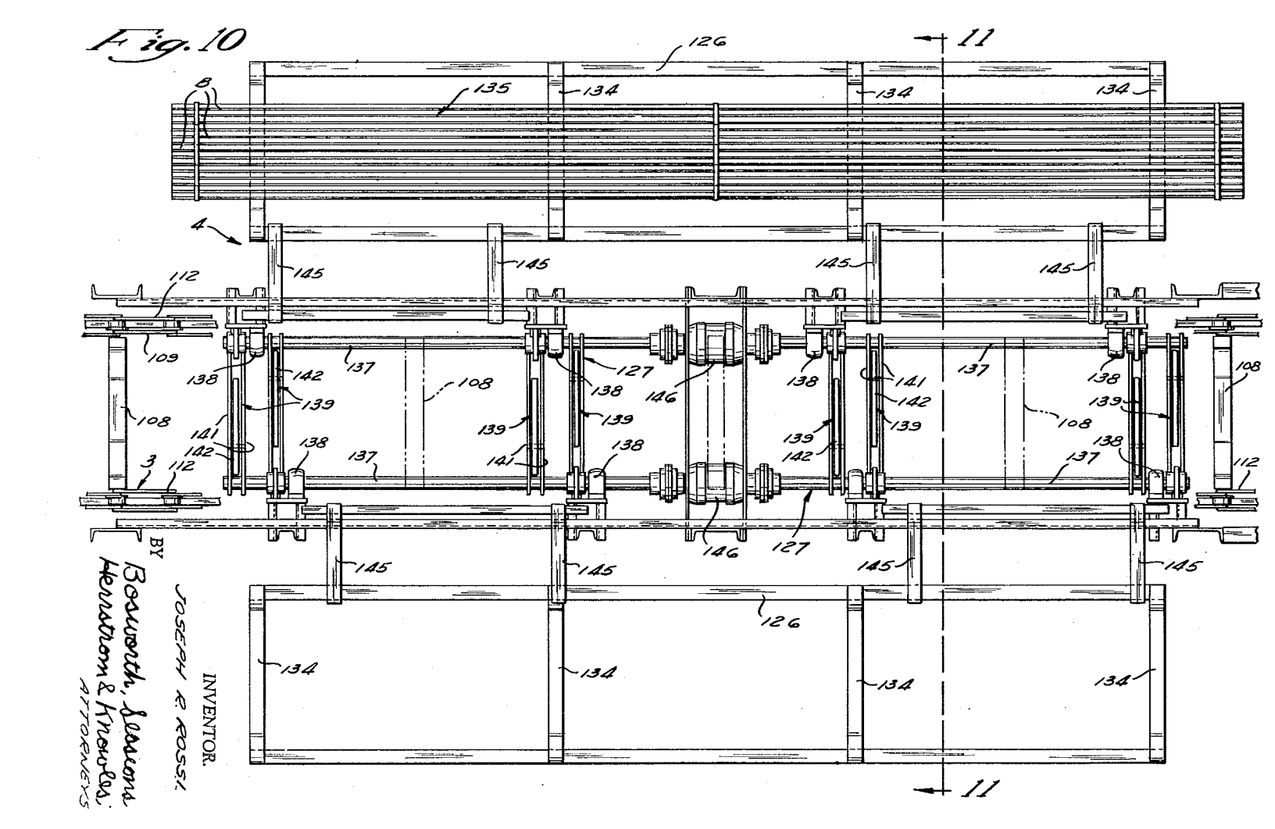
FIGURE 10 is a plan elevation of the bundle unloading section, corresponding generally to the right hand portion of FIGURE 2 but to a larger scale.

As shown to advantage in FIGURES 2, 3, 4 and 10, the illustrated conveyor 3 comprises a plurality of bundle-carrying cross members 108 extending across the conveyor. Although for convenience only two members 108 are shown in FIGURE 10, the members in reality are spaced so that several of these members support a group of pipe bundles. Preferably each of members 108 has a depressed center portion and upwardly and outwardly inclined sides when in bundle-carrying position at the top of the conveyor to provide secure support for the group of bundles. Each cross member 108 is rigidly connected to certain of the link members 109 which are pivotally connected together, with rotatable flanged rollers 111 at the pivot points, to form an endless conveyor chain 112 at each side of the conveyor. The rollers 111 of the chains 112 travel along upper and lower supporting rails 113 and 114 fixed to the conveyor frame 115 at the sides of the conveyor.

At each end of the conveyor, the conveyor side chains pass around a pair of spaced sprockets 116 mounted on a shaft 117 rotatably supported in the frame 115 of the conveyor; each of these sprockets has peripheral recesses which receive and engage the rollers 111 of the chains. At the unloading end of the illustrated conveyor, the conveyor sprocket shaft 117 also rigidly carries a drive sprocket 121 which is positively driven by motor 122 through speed reducer 123 and chain 124. Operation of the motor to move and stop the conveyor as required is controlled by means to be later described.

Figure 2:
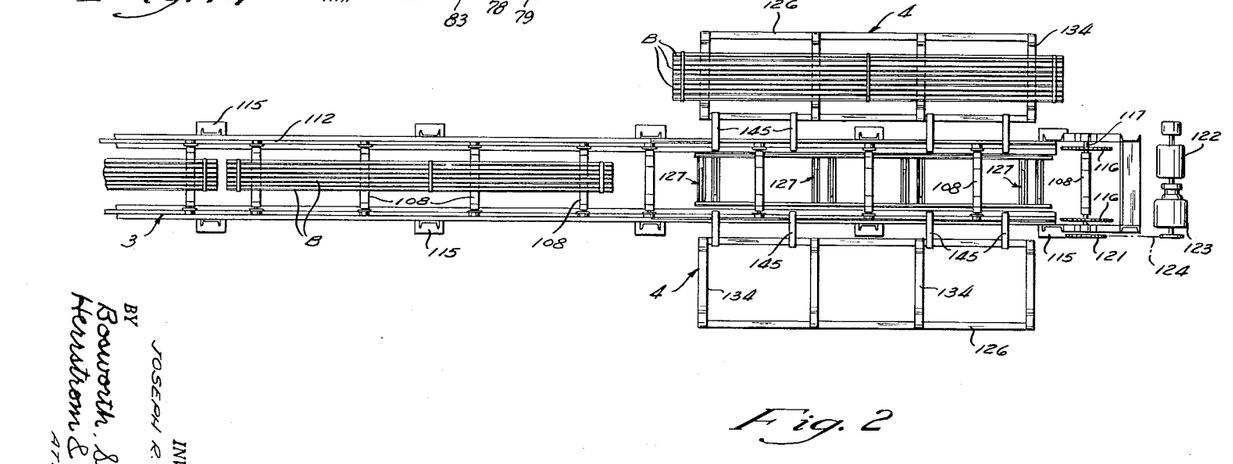
FIGURE 2 is a somewhat diagrammatic plan of another portion of the apparatus of FIGURE 1, to the same scale, showing the remainder of the bundle conveyor and the unloading section.

*Unloading section.*—As shown in FIGURE 2, each group of a predetermined number of pipe bundles is transported by the conveyor 3 to the unloading section 4, where it is unloaded into a cradle 126 located at the side of the conveyor, by an unloading mechanism 127. In the illustrated apparatus, as is preferable, the unloading section is located at the drive end of the conveyor and includes at each side of the conveyor a cradle 126 and unloading mechanism 127 adapted to unload into the cradle a predetermined number of pipe bundles. After a predetermined number of bundles has been unloaded into one of the cradles 126 by its associated unloading mechanism 127, the apparatus automatically ceases loading into such cradle and the unloading mechanism 127 on the opposite side of the conveyor then unloads pipe bundles into its associated cradle 126 until such cradle also is filled with a predetermined number of pipe bundles. Meanwhile the load may be removed from first filled cradle, leaving the cradle empty and ready to receive another load when the second cradle is filled. The cycle can be repeated as long as desired.

As shown in FIGURES 10 to 13, inclusive, each cradle 126 is supported in a longitudinally extending trench 128 in the floor 6 to provide the cradle depth required to permit pipe bundles to be accumulated in a load of the desired compact cross section. The rigid frame structure 129 of each cradle is made up of spaced longitudinally extending bottom frame members 131 fixed at their ends and at intermediate points to bottom cross members 132 and vertical side member 133; a curved bundle-supporting member 134 is fixed to each set of a bottom and vertical members so that the load 135 of pipe bundles is supported at spaced points. The frame 129 of each cradle is supported at four bottom positions by suitable load cells 136 which measure and register by suitable electric means the increase in weight of the cradle caused by pipe bundles loaded into it and thus enable a determination to be made by weight of the number of pipes of a given type loaded into the cradle.

Each of the unloading mechanisms 127 comprises an actuating shaft 137 which is approximately as long as and parallel to the associated cradle 126, mounted for rotary movement in bearings 138 fixed to an inner side of the conveyor frame. From FIGURE 10 it is apparent that each shaft 137 rigidly carried four lifting arms 139 which extend transversely of the shaft at spaced positions, so they can engage the pipe bundles at their ends and at intermediate points to support and lift them off the conveyor without undue deflection. As is clear from FIGURES 10 to 13, inclusive, each lifting arm 139 comprises a pair of spaced parallel main members 141 rigidly fixed at one end to one shaft 137 and terminating at points above and beyond the other shaft 137 at the opposite side of the conveyor frame, and pivotally supporting between them an auxiliary lifting member 142; a tie rod 143 is pivotally connected to the member 142 at its end remote from its supporting shaft 137, and to the frame 115 of the conveyor.

The locations of the shafts 137, the lengths of the associated members 141, 142, and 143, and the locations of their points of connection are such that when each lifting arm 139 is in its lowermost position its auxiliary lifting member 142 is substantially completely contained between the main lifting members 141 and the lifting arm as a whole is disposed between the cross members 108 carried by the upper and lower runs of the side chains 112 of the conveyor 3; the locations also are such that when each lifting arm 139 is in its highest lifting position between cross members 108 when they are stationary, the main members 141 of the arm are substantially vertical and the auxiliary lifting member 142 is tilted downwardly toward the cradle 126 at the side of the conveyor with which the particular lifting arm is associated. Preferably, as shown, on each lifting arm 139 the distance between the axis of shaft 137 and the axis of pivot connection 144 is greater than the distance from the shaft axis to the centerline of the conveyor, and the length of auxiliary member 142 between its free end and its pivot 144 is greater than its length between the pivot and the connection to its tie rod 143. Consequently the free end portions of members 141 and 142 of the lifting arms 139 define a trough or cradle which at the beginning of the lifting operation changes shape and position so that at the end of the lifting stroke the free end portions of members 142 support the bundles and the free end portions of members 141 push the bundles off the arm 139 into the cradle 126. Preferably, the conveyor frame 115 carries inclined skid members 145 which bridge the space between the top of the conveyor frame 115 and cradle 126 and are overlapped by the auxiliary members 141 at the end of the lifting stroke of the lifting arms 139, to aid in supporting and guiding the bundles being discharged into the cradle.

Each actuating shaft 137 is rotated as required by a motor 146 mounted on the frame of the conveyor and preferably located centrally of the shaft 137 so as to equalize torque stresses. The motor 146 illustrated in FIGURE 10 is a conventional type powered by hydraulic fluid supplied under pressure from a suitable source not shown, and is controlled as later described.

Neither of the unloading mechanisms 127 operates while the conveyor is moving, and when the conveyor is stationary and the unloading section 4 is operating, the unloading mechanisms 127 do not operate simultaneously. One mechanism 127 operates to the exclusion of the other to remove sequentially from the cross members 108 of the conveyor 3 groups of pipe bundles brought into the loading section by the conveyor and to load such pipe bundles into the associated cradle 126; during unloading, after each group of bundles is removed from the conveyor 3 the conveyor is caused to move to bring another group of bundles into the loading section 4 while both unloading mechanisms are stationary. This alternate operation of unloading mechanism and conveyor is continued until a predetermined number of bundles has been loaded into the cradle, after which its unloading mechanism is halted and that on the other side of the conveyor is operated alternately with the conveyor until the predetermined number of bundles are loaded into the other cradle 126, after which the cycle may be repeated. Suitable control means to be later described determines when a predetermined number of pipe bundles has been loaded into a cradle and controls which of the loading mechanisms will operate; such means also controls the operations of the loading mechanism motors 146 and the conveyor motor 122 to perform the above described cycle of operations. Alternatively, the load cells 136 under each cradle, in association with suitable circuit means, can be used to control operations of the lifting arms and conveyor as described above.

Figure 14:
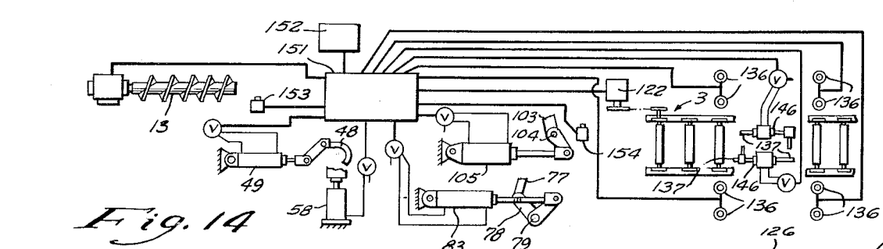
FIGURE 14 is a schematic diagram illustrating the control system of the apparatus disclosed herein.

*Control means—cycle of operations.*—The means for controlling and coordinating the operations of the various portions of the apparatus described above is diagrammatically illustrated by FIGURE 14, in which the electrical circuits between controlling and controlled elements are shown as single heavy lines for convenience. This means comprises suitably electrically operated cycling means, generally indicated by reference numeral 151, embodied in the control center 5 (FIGURE 1) and connected by suitable electrical circuit means to a control panel 152 and to various control and actuating elements of the apparatus to perform the operations described below.

At the commencement of the cycle of operations described below, it is assumed that the control panel and other parts of the apparatus have been properly set to form and handle bundles of a predetermined number of pipes of a certain size and type, that there is a continuing supply of such pipes on the inclined members 11 of the table 1, that the helical conveyor members 13 are filled with pipes, that feeder members 26 are in their extended positions, that the pipe-supporting fixture wheels 59 of the bundling devices 41 are in their uppermost positions, that the pivoted wrapping head members 48 are opened, and that on the bundle discharging devices 42 the cross heads 75 are in their lowermost positions and the actuating arms 103 and stop members 92 are in their raised positions.

At the beginning of the cycle of operations, the helical members 13 are rotated in unison for a predetermined number of revolutions until they discharge a predetermined number of pipes P over the extended feeder members 26 into the bundling section 2 of the apparatus, while taking from the supply of pipes on members 11 a corresponding number of pipes, as previously described. As the pipes pass into the bundling section, they travel in close proximity to a counting device 153 (FIGURE 3) mounted centrally of the forward discharge edge of table 1; this device, which is preferably a commercially available proximity sensor switch, transmits an electrical signal to cycling means 151 as each pipe passes into the bundling section 2. The appropriate recesses 64 of the fixture wheels 59 receive the pipes free of interference from any other part of the apparatus, so that the pipes automatically assume the proper transverse positions in the bundle determined by the shapes of the recesses 64. The pipes are accurately deposited longitudinally in such recesses 64 since the guide plate 133 of table 1 accurately positions the pipes longitudinally relatively to each other and since the extended feeder members 26 terminating in close vicinity to the recesses 64 insure that the pipes drop into such recesses while the pipes are in substantially parallel relation. After the predetermined number of pipes has thus passed from table 1 into the recesses of fixture wheel 59 and the like number of signals has been sent by the counting device 153 to the cycling means 151, the device 151 through suitable circuit means halts rotation of helical conveyor members 13 and controls the air cylinders 58 to lower the fixture wheels 59 to bundling positions; by suitable circuit means the air cylinders 49 are then controlled from device 151 to move the pivoted portions 48 of the wrapping heads into operating position, and to cause the wrapping machines 46 of the bundling devices 41 to operate to apply steel strapping to the pipes P to form a completed pipe bundle B.

At the conclusion of this operation, the wrapping machines 46 through suitable circuit means control air cylinders 49 to open the pivoted head portions 48 of the wrapping machines, the air cylinder 32 to move the feeder members 26 to their retracted positions to provide clearance for the bundle to discharge, and the air cylinder 83 to partially rotate shaft 79, causing the cross head 75 of each bundle discharge device 42 to move to its uppermost position. As indicated above, this movement causes the bundle lifting members 76, guided by cam surfaces 87, to lift the completed wrapped bundle B of pipes out of the recesses 64 of the fixture wheels 59 and from the recesses 72 of the bundle discharge devices 42, and deposit it on the inclined surfaces 91 of the bundle discharge devices 42. As each bundle slides by gravity down such inclined surfaces, it passes over a counting device 154 (see FIGURE 8) preferably a known proximity sensor switch, which signals the cycling means 151 through suitable circuit means; this device 151 then controls air cylinder 83 to lower the cross head 75 of each bundle discharge device 42 to its lowermost position where it clears the recess 72 of the device, cylinder 32 to move the feeder members 26 to their extended positions, air cylinders 58 to raise the fixture wheels 59 to their uppermost pipe-receiving positions, and motor 21 to rotate helical conveyor members 13 to pick up and discharge the pipes P for the next bundle. The above described cycle is repeatedly performed until a group consisting of a predetermined number of completed pipe bundles B has been discharged onto the inclined surfaces 91 of the bundle discharge devices 42 and the counting device 154 has so signalled the cycling means 151.

Thereafter the cycling means 151 controls the air cylinder 105 through a suitable circuit so it partially rotates shaft 104 to move the actuating arms 103 of the bundle discharge devices 42 toward the conveyor to cause the stop members 92 to retract and permit the group of bundles to discharge onto the conveyor 3, and then partially rotates shaft 104 to move the actuating arms 103 away from the conveyor and to their original positions where they reset the stop members 92 so they can cause the accumulation of another group of bundles. After a suitable time delay provided by the cycling means, the same signal which thus controls the device 42 to discharge the bundles onto conveyor 3 also controls the conveyor to move the group of pipe bundles on the conveyor out of the bundling section 2 for a predetermined distance. This distance preferably is only sufficient to cause the bundles on the conveyor to clear the bundling section, although the conveyor may be caused to move the bundles the entire distance into the unloading section 4.

Figure 11:
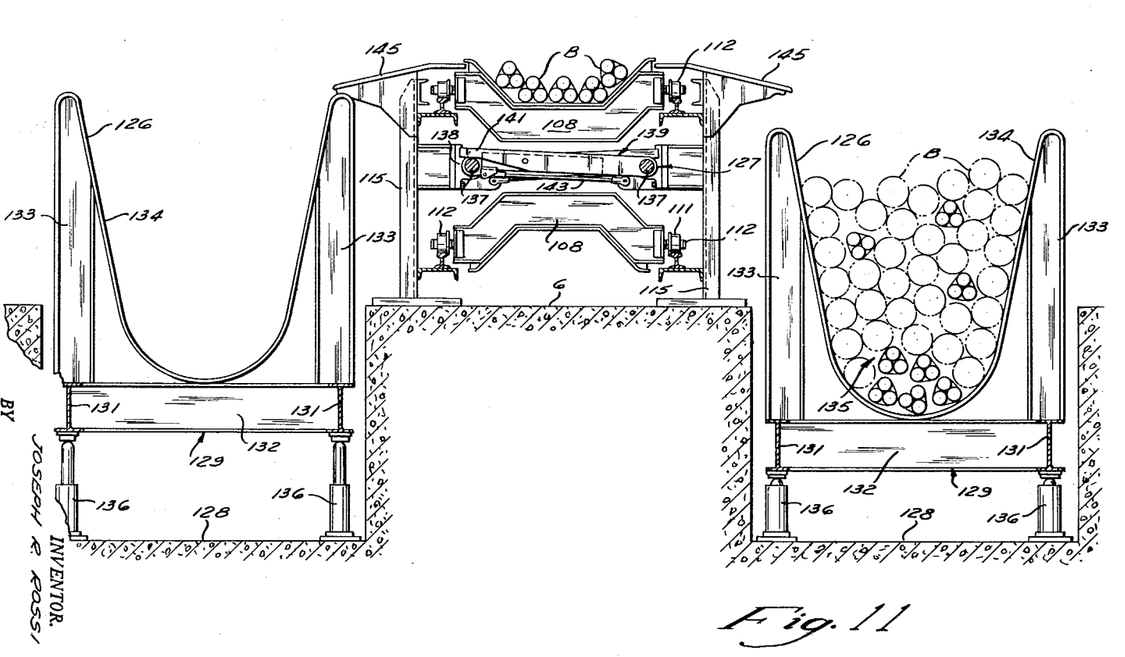
FIGURE 11 is a section along line 11—11 of FIGURE 10, but to a larger scale.
Figure 12:
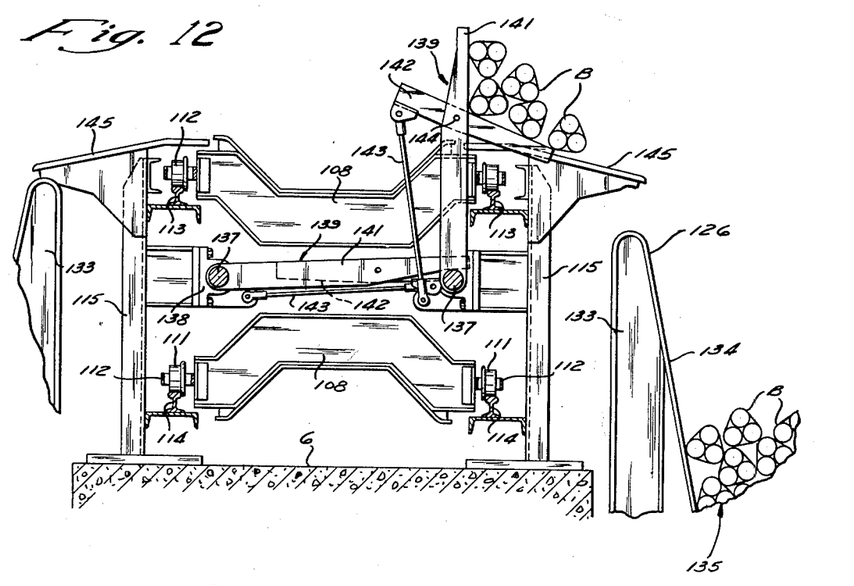
FIGURE 12 is a section generally corresponding to the section of FIGURE 11, but showing the bundle unloading mechanism operating to unload bundles from the conveyor onto the loading cradle at the right.
Figure 13:
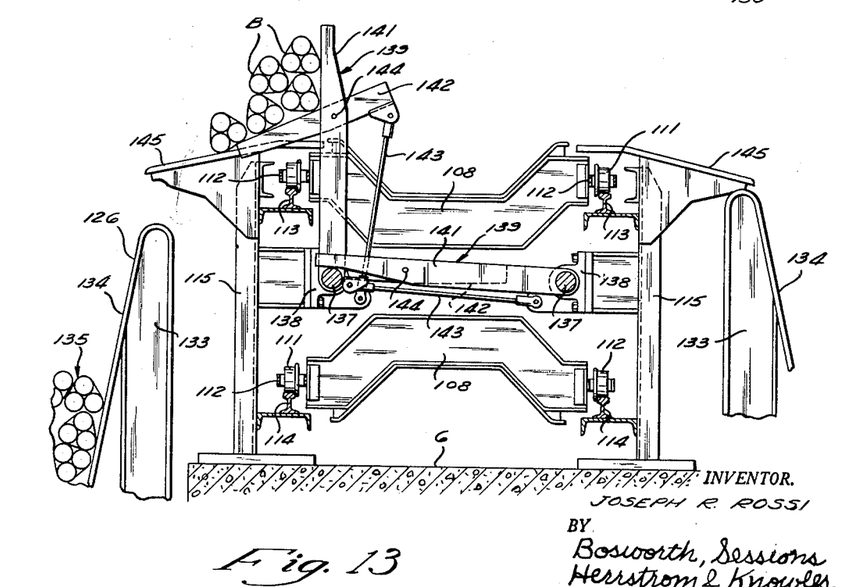
FIGURE 13 is a similar section showing the bundle unloading mechanism operating to unload bundles from the conveyor onto the loading cradle at the left.

When conveyor 3 brings a group of bundles into the unloading section 4, the cycling means 151, in combination with suitable circuit means, halts the conveyor in a predetermined position so its upper cross members 108 clear the unloading mechanisms 127, and so the pipe bundles are transversely substantially aligned with the cradles. Furthermore, the bundle discharge devices 42, conveyor 3 and unloading station 4 are so proportioned and located relatively to each other that when the conveyor 3 is thus stopped relatively to the unloading station 4, it is also located properly to receive bundles from the bundle discharge devices 42. After the conveyor is thus halted, the hydraulic motor 146 for one of the unloading mechanisms 127 is controlled by cycling means 151 through suitable circuit means to operate the lifting arms 139 at one side of the conveyor frame 15 to raise the bundles from the upper conveyor cross members 108 and discharge them into the associated cradle 126 as shown in FIGURE 12 and then to return the lifting arms 139 to their lowermost position between the conveyor cross members as shown in FIGURE 11, where they remain until another group of bundles is moved by the conveyor into the unloading section. The cycle is repeated, the same set of lifting arms 139 being used for unloading, until a predetermined number of pipe bundles is deposited in the cradle 126 being loaded, as determined by the cycling means 151; the cycling means 151 then discontinues operation of the first mentioned set of lifting arms 139 and initiates similar operation of the other set of lifting arms 139, alternating with movements of the conveyor 3, to unload groups of pipe bundles B from the conveyor into the other cradle 126, as shown in FIGURE 13. During the unloading of groups of pipe bundles B from the conveyor 3 into the second cradle, the load of pipe bundles can be removed from the first cradle to free it for reloading. This cycle of operations may be repeated and continued as long as desired.

By suitable circuit means, it is possible automatically to count and record the number of pipes being discharged from the table 1 into the bundling section 2, the number of pipe bundles discharged onto conveyor 3, the number of pipe bundles unloaded into each cradle 126, and the total number of pipes and pipe bundles processed; suitable known means may be provided to record this information, if desired, as by printing it on a tape. By proper manual adjustment of the fixture wheels 59 of the various pipe supporting devices to locate the proper recesses 64 in the pipe-receiving position and by presetting controls at control panel 152 which are connected by suitable selective means to the signalling and actuating parts of the apparatus as a whole, it is possible to handle a range of pipe sizes and form them into bundles of different numbers of pipes the size of pipe preferably governing the number and arrangement of pipes and bundle, as shown in FIGURE 7.

In the event it is desired to handle bundles that each consist of a single pipe of larger diameter, the operations of bundling devices 41 and bundle discharge devices 42 may be bypassed or modified so that the single pipes can be discharged directly onto the inclined surfaces 91 of the bundle discharge devices 42, from which point the individual pipes can be handled as described above in connection with pipe bundles. When this is to be done, the parts take substantially the position shown in FIGURE 8, with the bundle-lifting members 76 in their uppermost position so that entrance to the bundling devices 41 is blocked. Also, the arms 26 are swung out of the way so that the pipes can drop directly onto the surfaces 91 where they are held by the stop members 92 until the desired number of pipes has been accumulated, whereupon the stop members 92 are moved downwardly to permit the pipes to move onto the conveyor. In this type of operation, the wrapping machines remain idle. The cycling means 151 is set so that the counting devices 153 and 154 both count the same desired number of pipes, whereupon the rotation of the helical conveyors 13 is stopped and the stop members 92 are moved downwardly and the pipes discharged onto the conveyor. Then the conveyor is advanced to carry the pipes away from the bundling section, the stop members are returned to the position shown in FIGURE 8, and the cycle started again.

From the foregoing description of a preferred form of the invention, it will be evident that I have provided an apparatus that will function rapidly, reliably, efficiently, and continuously so long as desired to discharge predetermined numbers of workpieces, to form securely wrapped bundles of elongated workpieces in which they are transversely aligned and arranged in predetermined cross sectional relationship to each other, and to provide for disposition of such bundles; it thus makes possible the effective use of high speed pipe manufacturing equipment. It is of sturdy, durable construction, substantially foolproof in operation, and requires a minimum of maintenance.

While the invention has been described herein in its application to the manufacture of pipe, those skilled in the art will appreciate that it may be adapted for other purposes and uses, and that various modifications may be made in the preferred form of the invention described herein without departing from the spirit and scope thereof.

I claim:

1. In an apparatus of the type described, means for positively transversely advancing a plurality of lengths of elongated material; means for causing the successive discharge from said advancing means of a predetermined number of said lengths while they are disposed in a predetermined longitudinal relationship to each other; holding means for receiving said number of lengths so discharged and arranging them in a substantially parallel relationship to each other; means for wrapping strand material around said arranged lengths to form a bundle; means for removing each of said bundles from said holding means and temporarily storing it; means for discharging a group of bundles after a predetermined number of them have been so stored; means for conveying said group of bundles away from said storing means to a predetermined location; and means at said location for removing said bundles and forming a load of a predetermined number of bundles.

2. In an apparatus of the type described, means for positively transversely advancing a plurality of lengths of elongated material; means for causing the successive discharge from said advancing means of a predetermined number of said lengths while they are disposed in a predetermined longitudinal relation with one end of each transversely aligned with the corresponding ends of other lengths; holding means for receiving said number of lengths so discharged and arranging them in a substantially parallel relationship to each other; means for wrapping strand material around said arranged lengths to form a bundle; means for removing each of said bundles from said holding means and temporarily storing it; means for discharging a group of bundles after a predetermined number of them have been so stored; means for successively conveying each group of bundles away from said storing means to a predetermined location; and means at said location operating to remove successively said groups of bundles and form them into a load of a predetermined number of bundles.

3. Apparatus for forming a bundle of lengths of elongated material comprising means for arranging a plurality of lengths of elongated material in a generally horizontal spaced substantially parallel relationship and for positively transversely advancing said lengths while they are so arranged; guide means for arranging said lengths in a predetermined relationship longitudinally of each other while they are being so advanced; means for causing the successive discharge from said first mentioned means of a predetermined number of lengths while in said spaced parallel longitudinal relationship; holding means for receiving said number of discharged lengths and arranging them in a substantially parallel relationship to each other; and means for securely wrapping said lengths to form a bundle.

4. Apparatus for forming bundles of lengths of elongated material comprising means for supporting a plurality of lengths of elongated material; a plurality of rotatable helical conveyor members mounted for rotation about parallel axes transverse to the longitudinal direction of said lengths, each of said helical conveyor members having a spaced external thread which is substantially identical in shape and substantially identically angularly disposed relatively to the threads of other helical conveyor members and having the end of the conveyor member adjacent said supporting means immovably fixed to the remainder of said conveyor member and so shaped that as said conveyor members rotate they selectively withdraw a single one of said lengths from said supporting means during each rotation; means for rotating said conveyor members in unison in the same direction, so that lengths of elongated material between the threads of said conveyor members are positively advanced transversely of the axis of said conveyor members and discharged in substantially parallel relation; means for causing the discharge from said conveyor members of a predetermined number of said lengths; spaced holding means having upwardly opening recesses adapted to receive said predetermined number of said lengths discharged from the ends of said helical conveyor members, said recesses being so shaped that they arrange said predetermined number of discharged lengths in substantially parallel relation in a bundle of predetermined compact cross section; means for wrapping said bundle with strand material while said lengths are in said recesses of said holding means; and means for removing said wrapped bundle from said holding means.

5. The apparatus of claim 4 comprising a guide member having a surface located at one side of and substantially parallel to the axis of said helical conveyor members, against which surface said lengths are urged during rotation of said helical members so that one end of each length is transversely aligned with the corresponding ends of other lengths before it is discharged by said helical members.

6. In apparatus of the type described, means for supporting a plurality of lengths of elongated material biased for movement in a direction transversely of the axes of said lengths; and a plurality of rotatable helical conveyor members adjacent the end of said supporting means toward which said lengths are biased with their axes of rotation extending transversely of the axes of said lengths on said supporting means, each of said helical conveyor members having a spaced external thread which is substantially identical in shape and substantially identically angularly disposed relatively to the threads of the other helical conveyor members and having the end of the conveyor member adjacent said supporting means fixed to the remainder of said helical conveyor member and so shaped that as said conveyor members rotate they selectively withdraw a single one of said lengths from said supporting means during each rotation, whereby when said conveyor members are rotated in unison in the same direction they selectively withdraw and positively advance in spaced substantially parallel relation between their threads a plurality of said lengths and individually discharge such lengths in spaced substantially parallel relation from the ends of the conveyor members remote from said supporting means.

7. The apparatus of claim 1 in which said means for positively transversely advancing a plurality of lengths of elongated material and said means for causing the successive discharge of a predetermined number of said lengths of comprise inclined means for supporting a plurality of lengths of elongated material, the direction of inclination being transversely of the axes of said lengths; a plurality of rotatable helical conveyor members at the lower end of said inclined supporting means with their axes of rotation extending transversely of the axis of said lengths on said supporting means, each of said helical conveyor members having a spaced external thread which is substantially identical in shape and substantially identically angularly disposed relatively to the threads of the other helical conveyor members and having the end of the conveyor member adjacent said inclined supporting means so shaped that as said conveyor members rotate they selectively withdraw a single one of said lengths from said inclined supporting means during each rotation, whereby when said conveyor members are rotated in unison in the same direction they selectively withdraw and positively advance in spaced substantially parallel relation between their threads a plurality of said lengths and individually discharge such lengths in spaced substantially parallel relation from the ends of the conveyor members remote from said supporting means; and guide means having a surface disposed at one side of and substantially parallel to the axes of said helical conveyors, so that as said helical conveyors rotate they urge one end of each of said lengths against said guide means to cause such ends to be transversely aligned.

8. A device for transversely discharging at least one length of elongated material from a predetermined lateral at rest position, comprising an upright frame adapted to have a length of elongated material extend transversely thereof in said predetermined at rest position; a member which is reciprocable in said frame in a substantially vertical direction; a discharge element, having a lifting surface, pivotally mounted on said reciprocable member; and means for moving said discharge element pivotally from a position in which when said reciprocable member is at the bottom of its stroke said lifting surface is located below said at rest position of said length, to a position in which when said reciprocable member is at the top of its stroke said lifting surface is located above said at rest position of said length.

9. The apparatus of claim 1 in which said means for discharging a group of bundles after a predetermined number of them have been stored comprises an upright frame adapted to have a length of elongated material extend adjacent said frame in a predetermined at rest position, said frame having a downwardly inclined surface adjacent said at rest position; a member which is reciprocable in said frame in a substantially vertical direction; a discharge element, having a lifting surface, pivotally mounted on said reciprocable member and adapted to move pivotally from a position in which when said reciprocable member is at the bottom of its stroke said lifting surface is located below said at rest position of said length, to a position in which when said reciprocable member is at the top of its stroke said lifting surface is located above said at rest position of said length and is inclined downwardly from said pivotal mounting toward said inclined surface on said frame, whereby said lifting surface can lift said length from said predetermined at rest position and deposit it on said inclined surface of said frame as said reciprocable member moves from its lowermost to its uppermost position; a stop member; and means for extending said stop member to hold a length of elongated material on said inclined surface and to retract said stop member to permit said length to discharge from said surface.

10. A device for transversely discharging a length of elongated material from a predetermined generally horizontal at rest position, comprising an upright frame adapted to have a length of elongated material extend transversely thereof in said predetermined at rest position, said frame having a cam surface and also a downwardly inclined surface adjacent said at rest position; a member which is reciprocable in said frame in a substantially vertical direction; and a discharge element pivotally mounted on said reciprocable member and having at one side of its pivotal mounting a cam follower adapted to movably contact said cam surface on said frame during the reciprocation of said reciprocable member and having on the other side of said pivotal mounting a lifting surface, said cam surface, cam follower, and lifting surface being so related that when said reciprocable member is at the bottom of its stroke said discharge element is in a position in which said lifting surface is located below said at rest position of said length and is inclined upwardly from said pivotal mounting, and when said reciprocable member is at the top of its stroke said discharge element is in a position in which said lifting surface is located above said at rest position of said length and is inclined downwardly from said pivotal mounting.

11. A device for transversely discharging a length of elongated material from a predetermined generally horizontal at rest position, comprising an upright frame adapted to have a length of elongated material extend transversely thereof in said predetermined at rest position, said frame having a cam surface and also a downwardly inclined surface adjacent said at rest position; a member which is reciprocable in said frame in a substantially vertical direction; a discharge element pivotally mounted on said reciprocable member and having on one side of its pivotal mounting a cam follower adapted to movably contact said cam surface on said frame during reciprocation of said reciprocable member and having on the other side of said pivotal mounting a lifting surface, said cam surface, cam follower and lifting surface being so related that when said reciprocable member is at the bottom of its stroke said discharge element is in a position in which said lifting surface is located below said at rest position of said length and is inclined upwardly from said pivotal mounting, and when said reciprocable member is at the top of its stroke said discharge element is in a position in which said lifting surface is located above said at rest position of said length and is inclined downwardly from said pivotal mounting, whereby said lifting surface can lift said length from said predetermined at rest position and deposit it on said inclined surface of said frame as said reciprocable member moves from the bottom of its stroke to the top of its stroke; a stop member adapted to be extended to hold lengths of elongated material on said inclined surface and to be retracted to permit them to discharge from said surface; means for extending and retracting said stop member; and means for causing said last mentioned means to retract said stop member when a predetermined number of said lengths have been deposited on said inclined surface by said discharge element.

12. Means for unloading elongated material from a conveyor, comprising a conveyor having a plurality of spaced cross members adapted to be moved longitudinally by the conveyor in a generally horizontal direction and adapted to carry elongated material; a set of a plurality of arm members pivotally mounted at a side of said conveyor for movement in unison from their lowermost position in which they are below said cross members carrying said elongated material, through intermediate positions in which they lift the elongated material from said cross members, to their uppermost positions in which they project between said cross members and discharge the elongated material from the side of the conveyor; and means for alternately operating said conveyor and said set of arm members to unload pieces of elongated material at one side of said conveyor, said means operating to move the conveyor to bring elongated material on its cross members to a position adjacent said arm members, to halt the conveyor, to raise said arm members to lift said elongated material and discharge it, and to return said arm members to their lowermost positions.

13. The apparatus of claim 12 comprising one of said sets of arm members on each side of said conveyor; means for halting the operation of the set of arms at one side of said conveyor when a predetermined number of pieces of elongated material have been unloaded thereby, and for initiating the operation of the set of arms at the other side of the conveyor to unload elongated material therefrom.

14. The apparatus of claim 13 comprising at each side of said conveyor means for weighing the elongated material unloaded at such side, and when a predetermined number of pieces has been reached, halting the operation of said arm members on said side and initiating operation of said arm members on the other side of said conveyor.

15. Apparatus for unloading lengths of elongated material from a conveyor, comprising a longitudinally traveling conveyor having laterally spaced flexible endless members arranged to travel in upper and lower runs, spaced cross members connected to said endless members and adapted to transport lengths of elongated material on the cross members connected to the upper runs; unloading means located at one side of said conveyor comprising a shaft extending longitudinally at said side of said conveyor, means supporting said shaft for oscillatory movement, a plurality of arm members rigidly fixed to said shaft and adapted to extend transversely of said conveyor and between said cross members of said upper and lower runs when said arm members are in their lowermost position, an auxiliary lifting member pivotally mounted on each of said arm members at a point spaced from said shaft, and a member connecting the end of said auxiliary member remote from said shaft to the support for said shaft; and means for oscillating said shaft in timed relation to the movement of said conveyor so that when said conveyor is stationary said arm members are raised between the cross members of said conveyor and said arm members and their associated auxiliary lifting members define a trough which carries said lengths of elongated material upwardly from said cross members and discharges them at the uppermost position of said arm members, and so that said arm members are lowered to their lowermost position to clear the conveyor and permit it to move to bring another length of elongated material over said arm members.

16. The apparatus of claim 1 in which said means for conveying said group of bundles of lengths of elongated material away from said storing means to a predetermined location and means at said location for removing said bundles and forming a load of a predetermined number of bundles comprises a conveyor having a plurality of spaced cross members adapted to be moved longitudinally by the conveyor in a generally horizontal direction and adapted to carry bundles of lengths of elongated material; a set of a plurality of arm members situated at a predetermined location and pivotally mounted at a side of said conveyor for movement in unison from their lowermost position in which they are below said cross members through intermediate positions in which they lift such bundles from said cross members, to their uppermost positions in which they project between said cross members and discharge said bundles from the side of said conveyor; and means for alternately operating said conveyor and said set of arm members until a predetermined number of such bundles have been unloaded at one side of said conveyor, said means operating to move the conveyor to bring bundles of lengths of elongated material on its cross members to a position adjacent said arm members, to halt the conveyor, to raise said arm members to lift said bundles and discharge them, and to return said arm members to their lowermost positions.

17. The apparatus of claim 1 in which said holding means for receiving the lengths and arranging them in substantially parallel relationship to each other comprises spaced holding members having upwardly open recesses shaped to receive and arrange in predetermined relationship said predetermined number of lengths of elongated material dropped therein, said holding members being located to engage said lengths at spaced locations thereon, and means for elevating said holding members to cause them to receive said lengths discharged from said means for positively transversely advancing said lengths at a location above the position in which they are located while being wrapped, said means being operable for lowering said lengths to the position in which they are wrapped.

18. Apparatus for successively forming wrapped bundles of lengths of elongated material comprising a wrapping device for wrapping strand material around a bundle while it is located in a predetermined generally horizontal wrapping position relatively to said device; means for transversely feeding lengths of elongated material in generally horizontal relation toward said wrapping device; spaced holding members having upwardly open recesses adapted to receive said lengths and hold them at locations spaced thereon; means for elevating said holding members to receive said lengths from said feeding means above said wrapping position, and for lowering said holding members to locate said lengths in said wrapping position; and means for lifting the bundles out of said holding members at the conclusion of the wrapping operation and moving them transversely away from said wrapping device and said holding members.

19. Apparatus for wrapping strand material around a bundle of lengths of elongated material comprising a wrapping device for wrapping strand material around a bundle while it is located in a generally horizontal, fixed wrapping position relatively to said wrapping device; a plurality of axially aligned, spaced, generally star-shaped fixture wheels, each having a plurality of differently shaped peripheral recesses; means for rotatably supporting each of said fixture wheels, said means including means for locking each of said fixture wheels with a selected recess upwardly open; and means for moving each of said fixture wheels between an uppermost position in which its upwardly open recess cooperates with corresponding recesses of other fixture wheels to support a bundle above said wrapping position, and a lowermost position in which said upwardly open recesses of said fixture wheels support the bundle in said wrapping position.

References Cited in the file of this patent

UNITED STATES PATENTS

| | | |
|---|---|---|
| 1,453,820 | Wright | May 1, 1923 |
| 2,342,622 | Gaumer | July 4, 1944 |
| 2,387,658 | Gruber et al. | Oct. 23, 1945 |
| 2,593,732 | Dahlman | Apr. 22, 1952 |
| 2,596,862 | Mirfield | May 13, 1952 |
| 2,615,553 | Kottmann | Oct. 28, 1952 |
| 2,702,130 | Grau | Feb. 15, 1955 |
| 2,751,781 | McConnell | June 26, 1956 |
| 2,763,108 | Garrett | Sept. 18, 1956 |
| 2,882,546 | Andrews et al. | Apr. 21, 1959 |
| 2,890,787 | Carter | June 16, 1959 |
| 2,948,385 | Todd | Aug. 9, 1960 |
| 2,959,268 | McConnell | Nov. 8, 1960 |
| 2,976,980 | Rodder | Mar. 28, 1961 |
| 3,018,596 | Dvorak et al. | Jan. 30, 1962 |

FOREIGN PATENTS

| | | |
|---|---|---|
| 352,355 | Switzerland | Apr. 14, 1961 |
| 547,931 | Belgium | June 15, 1956 |
| 682,133 | Germany | Oct. 9, 1939 |
| 837,616 | Great Britain | June 15, 1960 |
| 1,182,570 | France | Jan. 19, 1959 |
| 1,216,325 | France | Nov. 30, 1959 |